(12) United States Patent
Matsukawa et al.

(10) Patent No.: US 6,365,295 B1
(45) Date of Patent: Apr. 2, 2002

(54) FUEL CELL AND SEPARATOR COMPRISING CONTACT LUGS WITH SPECIFIC WIDTHS

(75) Inventors: Masanori Matsukawa; Masahiro Mizuno; Yasuyuki Asai; Yasuo Kuwabara; Yixin Zeng; Katsuhiro Kajio, all of Aichi (JP)

(73) Assignees: Aisin Takaoka Co., Ltd., Toyota; Aisin Seiki Kabushiki Kaisha, Kariya, both of (JP)

( * ) Notice: Subject to any disclaimer, the term of this patent is extended or adjusted under 35 U.S.C. 154(b) by 0 days.

(21) Appl. No.: 09/493,607

(22) Filed: Jan. 28, 2000

(30) Foreign Application Priority Data

Jan. 29, 1999 (JP) .......................................... 11-022780

(51) Int. Cl.⁷ .......................... H01M 8/02; H01M 8/04
(52) U.S. Cl. ............................................ 429/34; 429/39
(58) Field of Search .................. 429/26, 30, 26.32, 429/33, 34.38, 37

(56) References Cited

U.S. PATENT DOCUMENTS

| | | | | |
|---|---|---|---|---|
| 3,717,505 A | * | 2/1973 | Unkle, Jr. ..................... | 136/86 |
| 3,764,391 A | * | 10/1973 | Warszawski ................. | 136/86 |
| 4,037,023 A | * | 7/1977 | Grehier ....................... | 429/12 |
| 4,910,100 A | * | 3/1990 | Nakanishi .................... | 429/32 |
| 4,988,583 A | * | 1/1991 | Watkins ....................... | 429/30 |
| 5,445,903 A | * | 8/1995 | Cable .......................... | 429/33 |
| 5,541,015 A | * | 7/1996 | Tajima ........................ | 429/26 |
| 5,589,285 A | * | 12/1996 | Cable .......................... | 429/13 |
| 5,824,428 A | * | 10/1998 | Nishida ....................... | 429/26 |
| 5,840,438 A | * | 11/1998 | Johnson ...................... | 429/30 |
| 5,858,567 A | * | 1/1999 | Spear .......................... | 429/12 |
| 6,232,008 B1 | * | 5/2001 | Wozniczka ................... | 429/39 |

FOREIGN PATENT DOCUMENTS

| | | | | |
|---|---|---|---|---|
| DE | 10003682 | * | 8/2000 | ............ H01M/8/02 |
| JP | 5-251097 | | 9/1993 | |
| JP | 8-31434 | * | 2/1996 | ............ H01M/8/02 |
| JP | 10-106594 | | 4/1998 | |
| JP | 11-45727 | * | 2/1999 | ............ H01M/8/02 |
| JP | 2001076746 | * | 3/2001 | ............ H01M/8/02 |
| WO | WO 01/41239 | * | 6/2001 | ............ H01M/4/86 |

* cited by examiner

*Primary Examiner*—Gabrielle Brouillette
*Assistant Examiner*—Mark Ruthkosky
(74) *Attorney, Agent, or Firm*—Burns, Doane, Swecker & Mathis, LLP (57) ABSTRACT

A fuel cell has a plurality of unit cells each including electrodes sandwiching an electrolyte membrane in-between, and a plurality of separators (3) each arranged between the unit cells. Each separator (3) has a plurality of contact lugs (65, 75) facing the electrodes and contacting the electrodes at pre-set contact widths and a plurality of fluid ducts (6a, 7a) each having a space between neighboring ones of the contact lugs (65, 75) as a duct width. The contact width of the contact lugs 65 (75) on a side closer to a fluid outlet is set smaller than that of the contact lugs 65 (75) on a side closer to a fluid inlet. Diffusion of an active material in an active material containing fluid into the inside of electrodes on a downstream side of a fluid duct, that is on a side closer to a fluid outlet, is facilitated.

4 Claims, 7 Drawing Sheets

FUEL CELL AND SEPARATOR COMPRISING CONTACT LUGS WITH SPECIFIC WIDTHS

This application claims priority to JP 11-02278 filed Jan. 29, 1999 in Japan.

FIELD OF THE INVENTION

This invention relates to a fuel cell and a separator and, more particularly, to a fuel cell having a fluid duct passed through by a fluid containing an active material, and a separator therefor.

DESCRIPTION OF RELATED ART

A fuel cell generating electricity by fuel is available on the market. This fuel cell has plural unit cells, each having electrodes sandwiching an electrolyte membrane in-between, and a plurality of separators arranged between the unit cells for partitioning the unit cells from one another. The separator is routinely formed with a fluid duct for guiding an active material containing fluid, supplied from a fluid inlet, towards a fluid outlet. In JP Patent Kokai JP-A-5-251097, there is disclosed a fuel cell in which plural fluid ducts passed through by the active material containing fluid are arranged sideby-side and in which the duct width of a portion of the fluid duct lying closer to the fluid inlet is set so as to be broader than that of the fluid duct portion lying closer to the fluid outlet. It is explained in the Publication that this structure is used in expectation of water droplets falling under the effect of gravity.

In JP Patent Kokai JP-A-10-106594, there is disclosed a separator comprised of plural grooved fluid ducts, arranged side-by-side, and through which flows an active material containing fluid. These fluid ducts are provided with a separator intermediate between the fluid inlet and the fluid outlet. In this separator, the fluid ducts are of the same width throughout the entire length of the fluid ducts.

Figure 9:
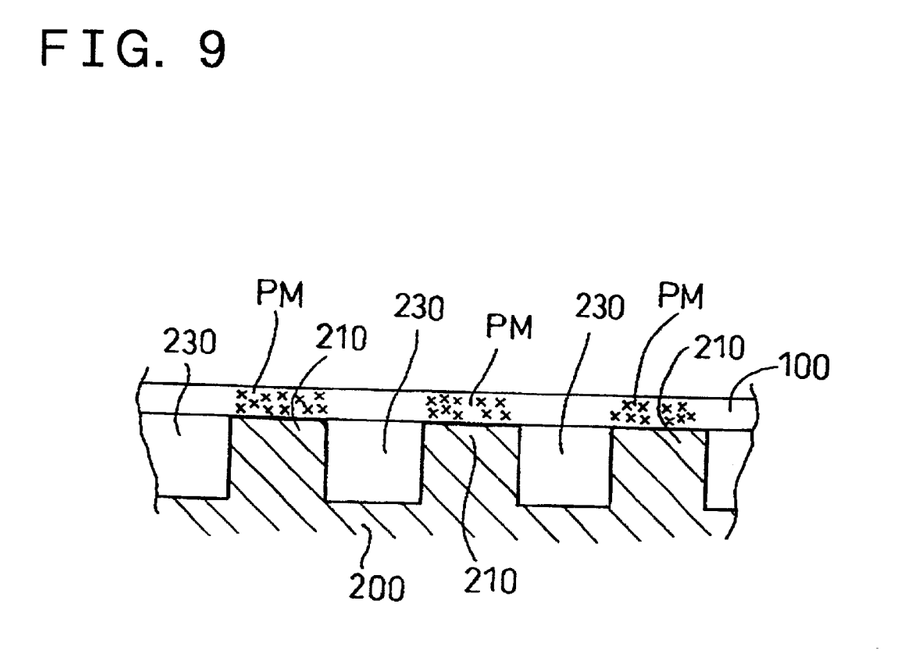
FIG. 9 is a cross-sectional view of a duct portion of a conventional separator.

In the above-described fuel cell, plural contact lugs 210 formed on a separator 200 face an electrode 100 and are contacted therewith at a pre-set contact width, as shown in FIG. 9. In this separator 200, a fluid duct 230 is formed in such a manner that the spacing between neighboring contact lugs 210 represents the duct width. Thus, the active material containing fluid, supplied from the fluid inlet, is guided along the fluid duct 230 towards the fluid outlet.

SUMMARY OF THE DISCLOSURE

In the separator 200, the contact lugs 210 face and contact with the electrode 100 at a pre-set contact width. Since the portion of the electrode 100 contacted with the contact lugs 210 is not directly facing the fluid duct 230, dispersion of the active material into the inside of the electrode 100 is limited. That is, the contact portion of the electrode 100 with the contact lugs 210 constitutes a diffusion limiting portion PM.

Also, in the fluid duct 230 of the fuel cell, the active material is consumed as the fluid duct proceeds along a direction proceeding from the upstream side to the downstream side, that is from the fluid inlet towards the fluid outlet. The result is that, on the downstream side of the fluid duct, that is on the side of the fluid duct towards the fluid outlet, the active material concentration of the active material containing fluid tends to be lowered.

In view of the above depicted status of the art, it is an object of the present invention to provide a fuel cell and a separator for a fuel cell in which dispersion or diffusion of an active material in the active material containing fluid into the inside of the electrodes on a side closer to the downstream side of the fluid duct, that is on the fluid outlet side, is advantageously facilitated.

The present inventor has conducted perseverant searches for developing an improved separator for a fuel cell and arrived at a concept that, if the contact width of the contact lugs on a downstream side of the flow duct, that is on a side closer to the fluid outlet, is set smaller than the contact width of the contact lugs on a side closer to the fluid inlet, internal diffusion to the electrode on the downstream side can be more uniform to improve the power generating performance on the downstream side. This concept has led to completion of the present invention.

(i) According to a first aspect of the present invention, a fuel cell has a plurality of unit cells each including electrodes sandwiching an electrolyte membrane in-between, and a plurality of separators each arranged between the unit cells. The separator has a plurality of juxtaposed contact lugs facing the electrodes and contacting the electrodes at pre-set contact widths and a plurality of fluid ducts each having a space between neighboring ones of the contact lugs as a duct width and each being configured for guiding a fluid containing an active material supplied from a fluid inlet towards a fluid outlet. In the separator, the contact width of the contact lugs on a side of the fluid duct closer to the fluid outlet is set smaller than that of the contact lugs on a side of the fluid duct closer to the fluid inlet.

(ii) According to a second aspect of the present invention, there is provided a separator for use in a fuel cell having a plurality of unit cells each including electrodes sandwiching an electrolyte membrane in-between and a plurality of separators each arranged between the unit cells has a plurality of juxtaposed contact lugs facing the electrodes and contacting the electrodes at pre-set contact widths and a plurality of fluid ducts each having a spacing between neighboring ones of the contact lugs as a duct width and each being adapted for guiding a fluid containing an active material supplied from a fluid inlet towards a fluid outlet. In the separator, the contact width of the contact lugs on a side of the fluid duct closer to the fluid outlet is set smaller than that of the contact lug on a side thereof closer to the fluid inlet.

(iii) According to a third aspect of the present invention, in the separator, there is provided an area in which the contact width of contact lugs on a side of the fluid duct closer to the fluid outlet is set smaller than that on a side thereof closer to the fluid inlet. Thus, on the downstream side of the fluid duct, that is on the side of the fluid duct closer to the fluid outlet, the ratio of contact of the contact lugs of the separator with the electrodes becomes smaller such that the area for each diffusion limiting portion is smaller. The result is that the active material can be dispersed and diffused more evenly into the inside of the electrode on the downstream side of the fluid duct, that is on a side closer to the fluid outlet.

PREFERRED EMBODIMENTS OF THE INVENTION

In a preferred embodiment of the present invention, the contact lugs contacting with the electrode are elongated from the upstream towards the downstream side of the fluid duct. In this case, the fluid ducts are in the form of elongated grooves. The contact lugs contact with the electrodes in a longitudinally and transversely dispersed/arrayed configuration, in a manner of defining lattice grooves, as shown for example in FIGS. 7 and 8.

In a preferred configuration of the present invention, the duct width of the fluid duct on its side closer to the fluid outlet can be smaller than that on its side closer to the fluid inlet. In such case, the number of contact lugs per unit area of the separator can be increased with advantage, thus enabling the contact area of the contact lugs with the electrodes to be reduced. The result is reduced area of each diffusion limiting area constituted by a contact lug (in total per unit cell) to improve the even diffusion to the electrodes.

DESCRIPTION OF THE EMBODIMENTS

Referring to the drawings, preferred embodiments of the present invention will be explained in detail.

Figure 1:
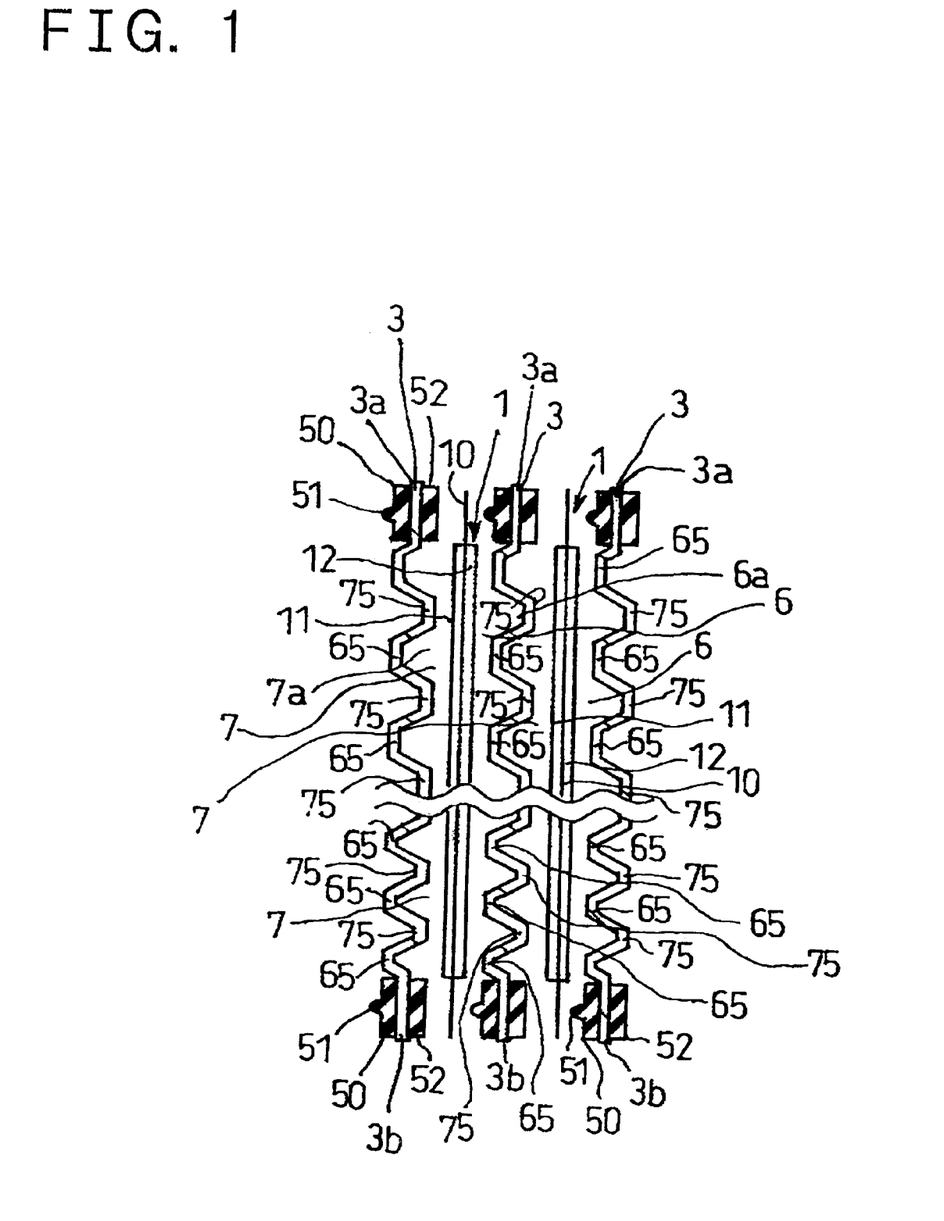
FIG. 1 is a cross-sectional view showing essential portions of a fuel cell.

FIG. 1 shows an exploded schematic view of essential portions of the fuel cell of a present embodiment comprised of a plurality of unit cells 1 each having a positive electrode 11 and a negative electrode 12 sandwiching a solid electrolyte membrane 10 exhibiting proton transmitting properties.

A separator 3 is provided between neighboring unit cells 1. Since FIG. 1 shows only essential portions, the numbers of the unit cells 1 and the separators 3 are small. In actuality, however, there are provided a large number of the unit cells 1 and the separators 3.

A negative electrode 12 of each unit cell 1 is fed with a fuel gas, which is a fluid containing hydrogen as a negative electrode active material. On the other hand, a positive electrode 11 of the unit cell 1 is fed with air as a fluid containing oxygen which is a positive electrode active material.

The separator 3 has the function of separating an air duct group 7, flown through by air containing the positive electrode active material, from a fuel gas duct group 6, flown through by a fuel gas containing the negative electrode active material. The separator also serves as a current collector for collecting generated electrical charges.

The separator 3 is prepared by press-forming, by a press mold, of a flat plate material of an electrically conductive metal material, such as aluminum alloy, carbon steel or stainless steel, to form contact lugs 65 and 75 on its one and opposite surfaces, respectively. As may be understood from FIG. 1, showing an exploded perspective view of the essential portions of the fuel cell, the contact lugs 65, 75 are contacted with the negative electrode 12 and with the positive electrode 11, respectively.

As also shown in FIG. 1, a frame-shaped seal 50 having a sealing projection 51 and another frame-shaped seal 52 are provided on an edge of the separator 3 for assuring sealing. The seals 50, 52 are molded of rubber or resin.

Figure 2:
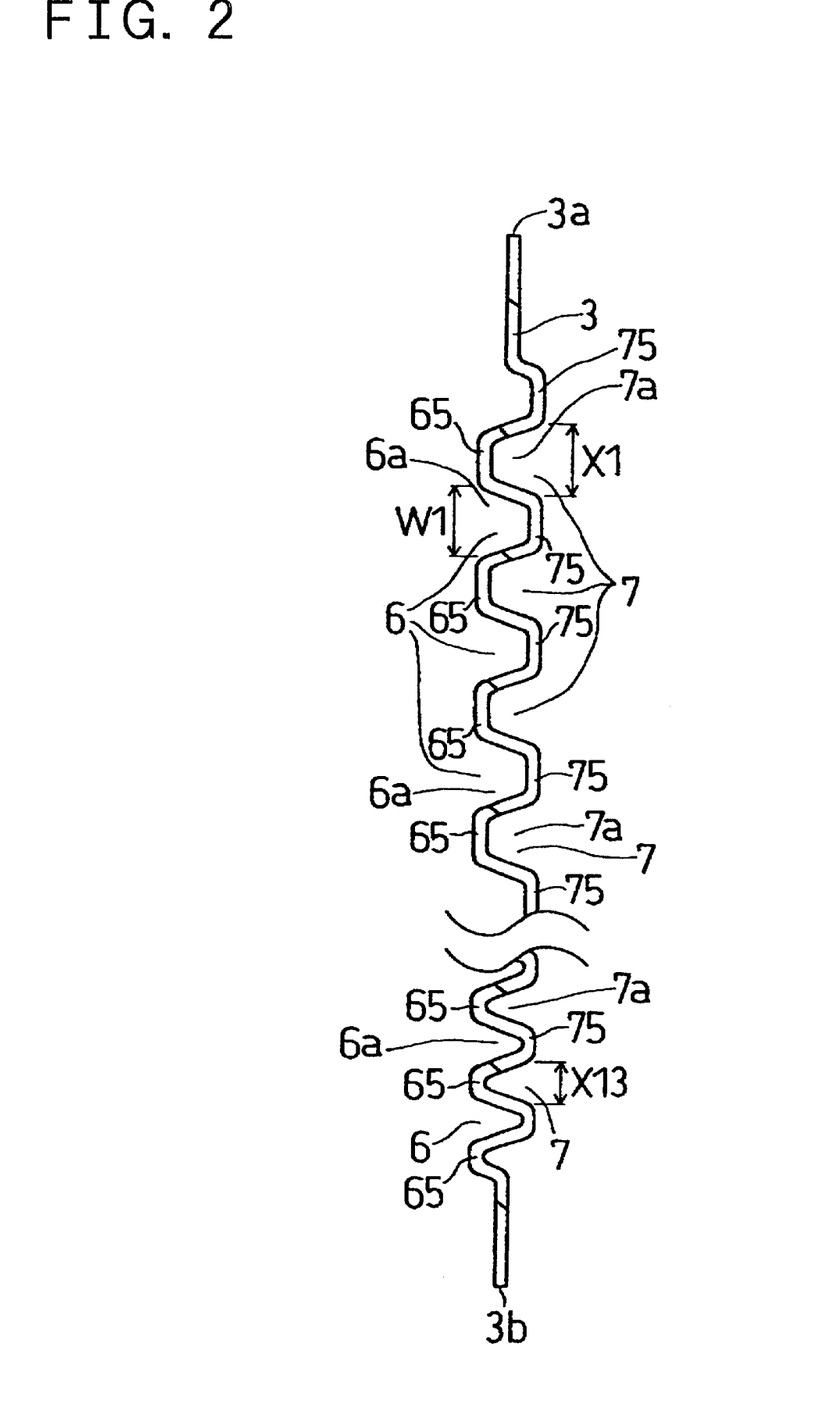
FIG. 2 is a cross-sectional view of a separator, taken along line II—II of FIG.3.

FIG. 2 shows the, longitudinal cross-section of the separator 3.

In FIG. 2, the contact lugs 65 on a surface of the separator 3 define grooved portions serving as the aforementioned fuel gas duct group 6, whilst the contact lugs 75 on the opposite surface of the separator 3 define similar grooved portions serving as the aforementioned air duct group 7.

Figure 3:
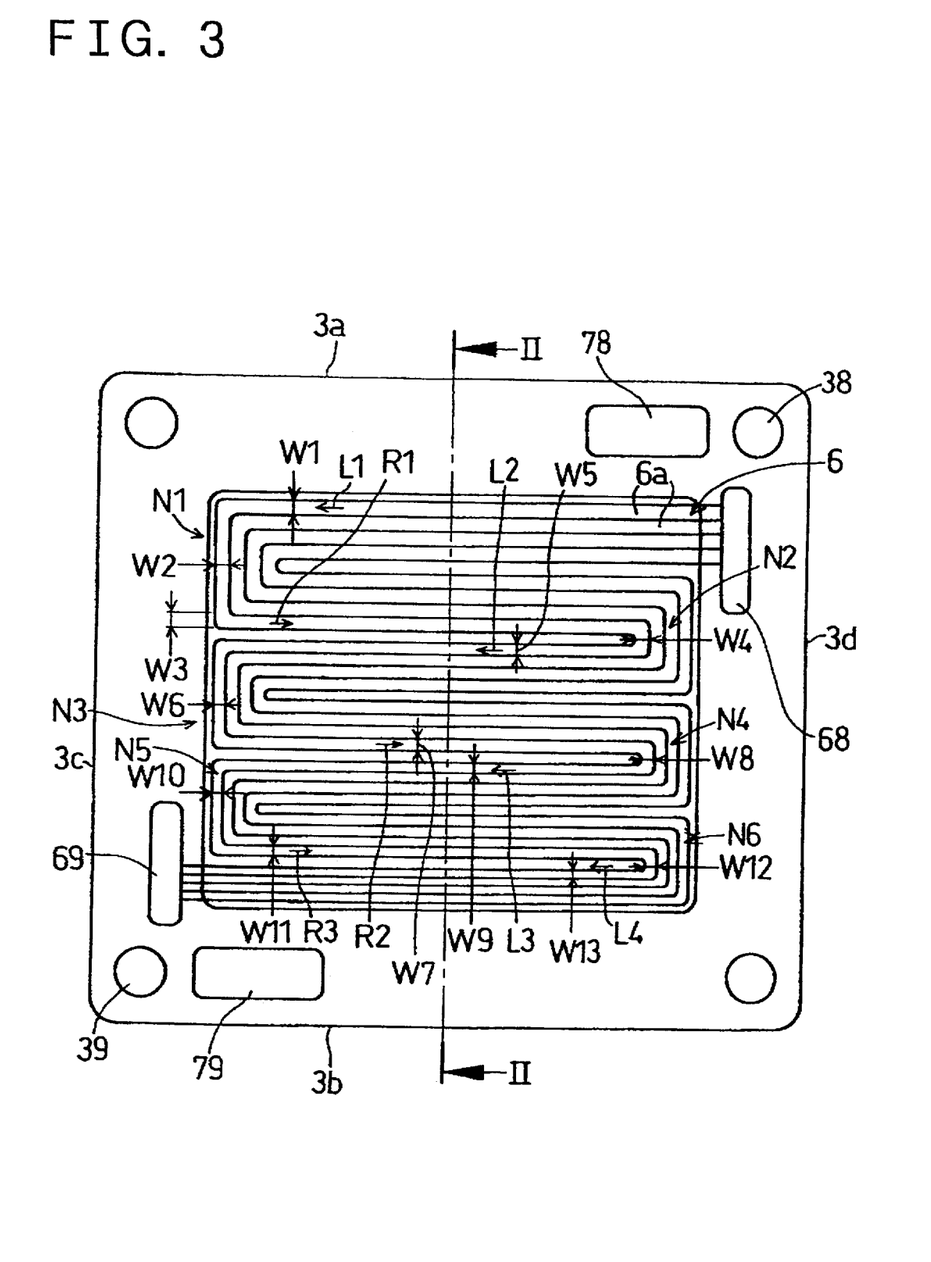
FIG. 3 is a front view of a separator showing a fuel gas duct group.
Figure 4:
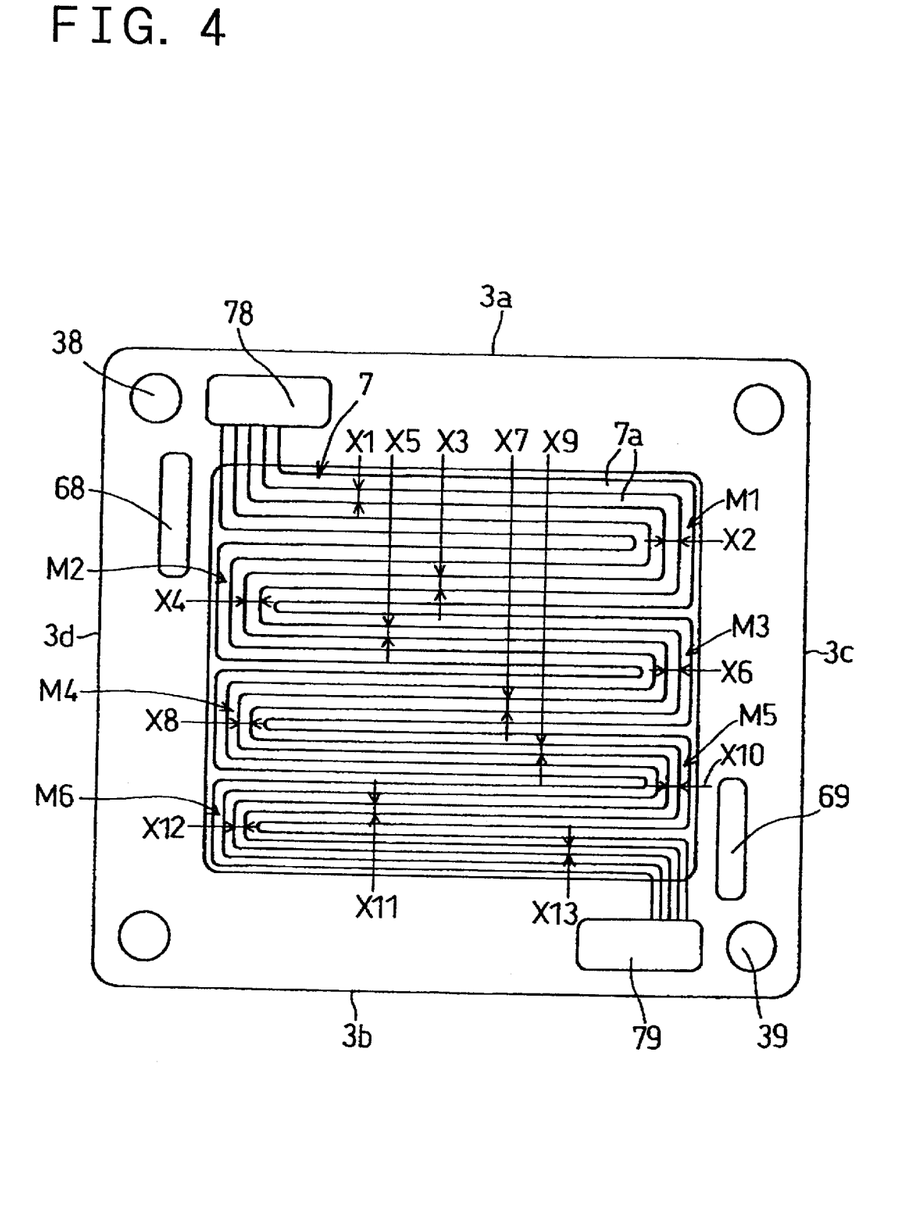
FIG. 4 is a back side view of the separator showing an air duct group.

FIGS. 3 and 4 show one and the other surfaces of the separator, respectively. In FIGS. 3 and 4, the separator 3 is in the form of a rectangle having an upper side 3a, a lower side 3b and two lateral sides 3c, 3d. When the fuel cell is completed, the upper side 3a and the lower side 3b operate as upper and lower sides in the vertical direction, respectively. An air inlet 78 adapted for operating as a fluid inlet is formed on the upper side of the separator 3, whilst an air outlet 79 adapted for operating as a fluid outlet is formed on the lower side of the separator 3. This allows air to flow from the upper to the lower side of the separator 3. The air inlet 78 and the air outlet 79 are provided on substantially diagonal positions of the separator 3.

On the upper side of the separator 3 is formed a fuel gas inlet 68 which can function as a fluid inlet. On the lower side of the separator 3 is formed a fluid gas outlet 69 operating as a fluid outlet. The fuel gas inlet 68 and the fuel gas outlet 69 are provided on substantially diagonal positions of the separator 3. On an upper portion of the separator 3, a cooling medium inlet 38 is formed between the fuel gas inlet 68 and the air inlet 78. On a lower portion of the separator 3 is formed a cooling medium outlet 39 between the fuel gas outlet 69 and the air outlet 79.

The cooling medium inlet 38 and the cooling medium outlet 39 also are provided at substantially diagonal positions of the separator 3.

As understood from FIG.3 in the present embodiment, the grooved fuel gas duct group 6, formed in the separator 3, serves for allowing the fuel gas supplied via the fuel gas inlet 68 to flow towards the fuel gas outlet 69, and is constituted by arraying plural fuel gas ducts 6a side-by-side in a parallel, meander-configuration. (In FIG. 3, the number of the fuel gas ducts is shown to be decreased for simplicity of the drawing.) It is noted that the fuel gas duct group 6 provides communication between the fuel gas inlet 68 and the fuel gas outlet 69 and operates as a fluid duct group.

Each of the fuel gas ducts 6a of the fuel gas duct group 6 is substantially constant in depth along its entire length. However, as may be understood from FIG. 3, each fuel gas duct 6a is gradually decreased in duct width stepwise in a direction proceeding from the fuel gas inlet 68 towards the fuel gas outlet 69, that is from the upstream towards the downstream sides. Thus, each of the fuel gas ducts 6a, making up the fuel gas duct group 6, is gradually (or stepwise) decreased in the fluid duct cross-sectional area in the direction proceeding from the fuel gas inlet 68 towards the fuel gas outlet 69, that is in a direction proceeding from the upstream towards the downstream sides in the separator 3.

Referring more specifically to FIG. 3, each of the fuel gas ducts 6a, making up the fuel gas duct group 6, proceeds from the fuel gas inlet 68 in the horizontal leftward direction (in the direction indicated by arrow L1) in FIG. 3, with a duct width W1, and is directed downwards at a first reversing area N1 with a duct width W2 so as to be then folded back in a vertically superposed position to proceed horizontally in the rightward direction (in the direction indicated by arrow R1) in FIG. 3, with a duct width W3. Each fuel duct 6a then is directed downwards, in a second reversing area N2, with a duct width W4, so as to be then folded back in a vertically superposed position to proceed horizontally in the leftward direction (in the direction indicated by arrow L2) in FIG. 3, with a duct width W5. Each fuel duct 6a then is directed (reflected) downwards in a third reversing area N3, with a duct width W6, to further proceed horizontally in the rightward direction (in the direction indicated by arrow R2) in FIG. 3, with a duct width W7. In a fourth reversing area 4, the fuel duct is directed downwards, with a duct width W8, and then proceeds horizontally in the leftward direction (in the direction indicated by arrow L3) in FIG. 3, with a duct width W9. Then, in a fifth reversing area N5, the fuel duct is directed downwards, with a duct width W10 so as to be then folded back in a vertically superposed relation to proceed horizontally in the rightward direction (in the direction indicated by arrow R3) in FIG. 3, with a duct width W11. In a sixth reversing area N6, the fuel duct then is folded back in a vertically superposed relation to proceed horizontally in the leftward direction (in the direction indicated by arrow L4) in FIG. 3, with a duct width W13 to reach the fuel gas outlet 69.

In the present embodiment, the duct widths are set so that W1=W2>W3, W3=W4>W5, W5=W6>W7, W7=W8>W9, W9=W10>W1, and W11=W12>W13. Stated differently, the duct width of the fuel gas duct 6a is set so as to be decreased progressively, with the flow duct cross-sectional area of the fuel gas duct group 6 decreasing progressively, with the increasing number of times of direction reversal.

FIG. 4 shows a grooved air duct group 7 formed on the other surface of the separator 3. As may be understood from FIG. 4, the grooved air duct group 7 serves for allowing air supplied via the air inlet 78 to flow towards the air outlet 79, and is constituted by arraying plural air ducts 7a side-by-side in a meander configuration. (In FIG. 4, the number of the air ducts is shown to be decreased for simplicity of the drawing.) It is noted that the air duct group 7 provides communication between the air inlet 78 and the air outlet 79 and operates as a fluid duct group.

Each of the air ducts 7a of the air duct group 7 is substantially constant in depth along its entire length. However, as may be understood from FIG. 4, each air duct 7a is gradually decreased in duct width stepwise in a direction proceeding from the air inlet 78 towards the air outlet 79. Thus, each of the air ducts 7a, making up the air duct group 7, is gradually decreased in the fluid duct cross-sectional area in the direction proceeding from the air inlet 78 towards the air outlet 79, that is in a direction proceeding from the upstream towards the downstream side.

Referring more specifically to FIG. 4, the air duct group 7 proceeds from the air inlet 78 in the horizontal rightward direction in FIG. 4, with a duct width X1, and is directed downwards at a first reversing area M1 with a duct width X2 so as to be then folded back in a vertically superposed position to proceed horizontally in the leftward direction in FIG. 4, with a duct width X3. The air duct group 7 then is directed downwards, in a second reversing area M2, with a duct width X4, so as to be then folded back in a vertically superposed position to proceed horizontally in the rightward direction in FIG. 4, with a duct width X5. The air duct group 7 then is directed downwards in a third reversing area M3, with a duct width X6, so as to be then folded back to proceed horizontally in the leftward direction in FIG. 4, with a duct width X7. In a fourth reversing area M4, the fuel duct is directed downwards, with a duct width X8, and then folded back to proceed horizontally in the rightward direction in FIG. 4, with a duct width X9. Then, in a fifth reversing area M5, the fuel duct is directed downwards, with a duct width X10 so as to be then folded back in a vertically superposed relation to proceed horizontally in the leftward direction in FIG. 4, with a duct width X1. In a sixth reversing area M6, the air duct group 7 is directed downwards, with a duct width X12, so as to be folded back to proceed horizontally in the rightward direction in FIG. 4, with a duct width X13 to reach the air outlet 79.

In the present embodiment, the duct widths are set so that X1=X2>X3, X3=X4>X5, X5=X6>X7, X7=X8>X9, X9=X10>X11, and X11=X12>X13. Stated differently, the duct width of the air duct group 7 is set so as to be decreased progressively, with the flow duct cross-sectional area of the air duct group 7 decreasing progressively, with the increasing number of times of direction reversal.

The rate of decrease in the duct width towards the downstream side of the air duct 7a in the air duct group 7 is so set that, with the duct width X1 on the extreme upstream side and with the duct width X13 of the extreme downstream side, X1:X13=3:2, only by way of illustration.

Also, if, in the present embodiment, the duct width of the air duct 7a of the air duct group 7 is compared to that of the fuel gas duct 6a of the fuel gas duct group 6, which is in a front-reverse relation to the air duct 7a of the air duct group 7, the former duct width is larger than the latter duct width, in consideration of the difference between the concentration of oxygen in air and that of hydrogen in the fuel gas.

For example, the duct width X1 on the extreme upstream side of the air duct 7a is related with the duct width W1 on the extreme upstream side of the fuel gas duct 6a, which is in the front-reverse relation with respect to the air duct 7a, by X1:W1=7:5, only by way of illustration.

Figure 5:
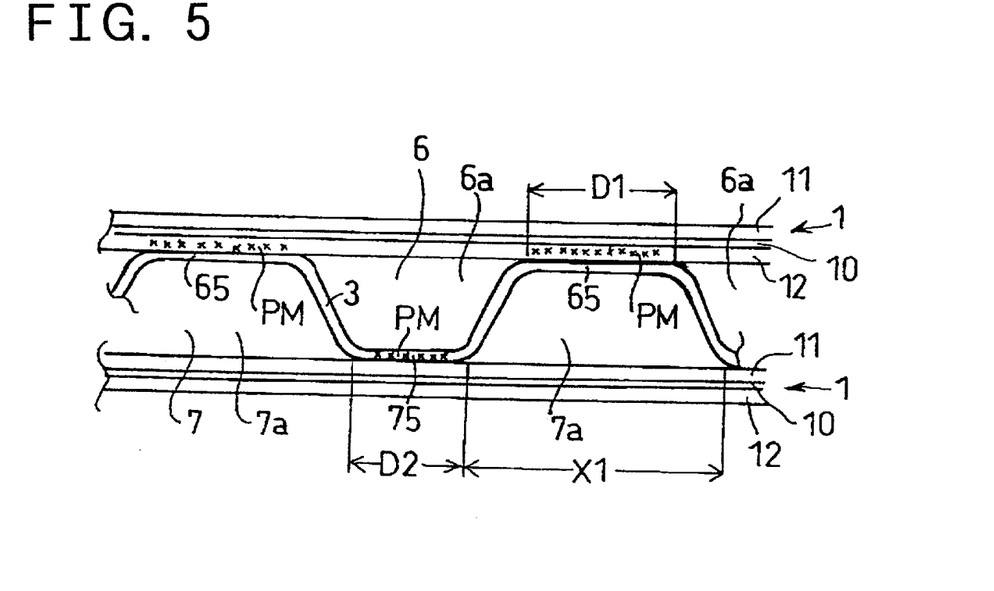
FIG. 5 is a cross-sectional view of a duct portion on the upstream side of the separator.
Figure 6:
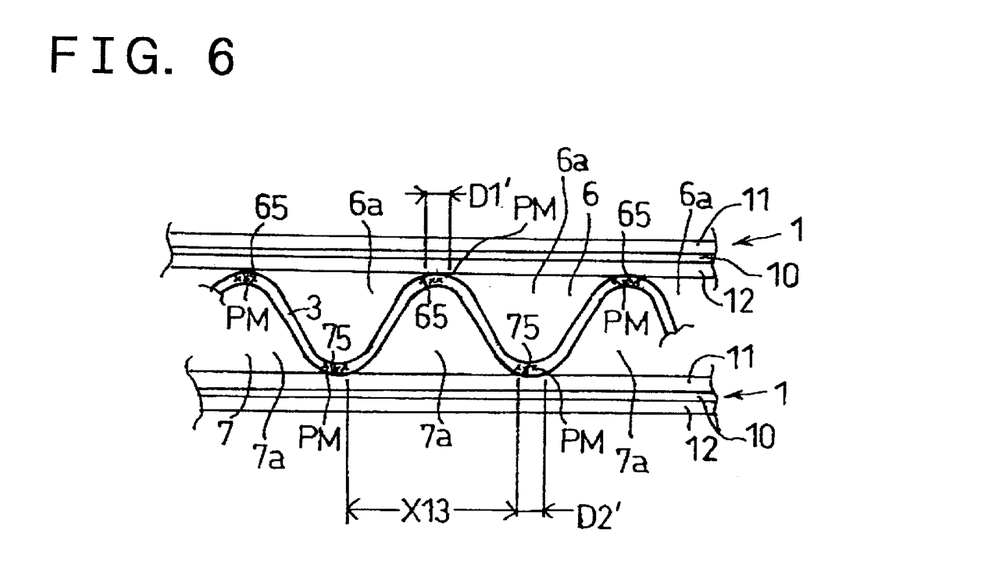
FIG. 6 is a cross-sectional view of a duct portion on the downstream side of the separator.

FIGS. 5 and 6 show essential portions of the present invention. FIG. 5 shows a cross-sectional view of the upstream side of the separator 3, that is the side thereof towards the air inlet 78 and the fuel gas inlet 68. Referring to FIG. 5, the air duct 7a has, on its upstream side, a larger duct width X1. As also shown in FIG. 5, the contact lugs 65 of the separator 3 contact with the negative electrode 12 with an appreciably large contact width D1. Also, the contact lugs 75 of the separator 3 contact with the positive electrode 11 with an appreciably small contact width D2.

FIG. 6 shows an enlarged cross-sectional view of a downstream side of the separator 3, that is the side of the separator 3 towards the air outlet 79 and the fluid gas outlet 69. On the downstream side, the air duct 7a has a small duct width X13 (X13<X1). As also shown in FIG. 6, the contact width of the contact lugs 65 on the downstream side of the separator 3 with the negative electrode 12 is appreciably small and is D1' (D1'<D1). In addition, the contact width of the contact lugs 75 on the downstream side of the separator 3 with the positive electrode 11 is appreciably small and is D2', (D2'<D2).

The contact portions of the contact lugs 65, 75 with the electrodes (positive electrode 11 or negative electrode 12) constitute the diffusion limiting portion PM, as mentioned above. In the present embodiment, it is possible to reduce the contact width of the portion of the contact lugs 65, 75 of the separator 3 with the electrodes (positive electrode 11 or negative electrode 12) on the downstream side, that is on the side of the separator towards the fluid outlet side. Therefore, the width of the diffusion limiting portion PM can be small as shown in FIG. 6. The result is that, in the present embodiment, it becomes meritoriously possible to improve uniformity in the diffusion and transmission of the active material to the electrodes (positive electrode 11 or negative electrode 12).

It is possible in this manner to compensate for lowering of the concentration of the active material in the active material containing fluid on the downstream side, if such lowering occurs.

Moreover, in the present embodiment, the contact lugs 65, 75 are arcuate, rather than being flat, in cross-section, on the downstream side, as shown in FIG. 6. Thus, the contact lugs 65, 75 are contacted in a point contact state or in a substantially point contact state with the electrodes, when seen in a cross-sectional section. This also helps reduce the contact width of the contact portions of the contact lugs 65, 75 with the electrodes (positive electrode 11 or negative electrode 12) to improve uniformity of diffusion of the active material into the interior of the electrodes.

Also, in the present embodiment, the cross-sectional area of the fuel gas duct 6a is designed to be decreased progressively as the fuel gas outlet 69 is approached. This contributes to suppression of the rarefaction of the concentration of the active material on the downstream side of the fuel gas duct 6a. Moreover, in the present embodiment, suppression of rarefaction of the concentration of the active material can be achieved for each of the fuel gas ducts 6a The same may be said of each of the air ducts 7a, so that it is possible to suppress rarefaction of the oxygen concentration on the downstream side of the air ducts 7a.

In the present embodiment, the cross-sectional area of the fuel gas duct 6a is decreased progressively as the fuel gas outlet 69 is approached, as mentioned above. It is thus meritoriously possible to suppress lowering of the flow velocity on the downstream side in the fuel gas duct 6a, that is on the side closer to the fuel gas outlet 69, to assure a flow velocity or to suppress water stagnation on the downstream side. The same may be said of the air duct 7a such that it becomes meritoriously possible to suppress the lowering of the flow velocity in the downstream side or on the side close to the air outlet 79, thus, it becomes possible to prevent the fuel gas flow in the fuel gas duct 6a from being obstructed by the air flow or water droplets in the air duct 7a.

Variant Embodiment

Figure 7:
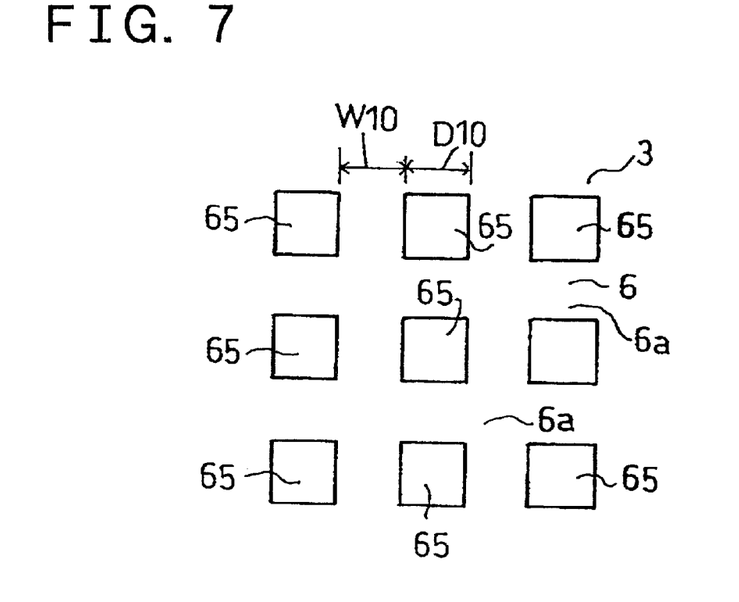
FIG. 7 is a cross-sectional view of a duct portion on the upstream side of the separator according to a modification.
Figure 8:
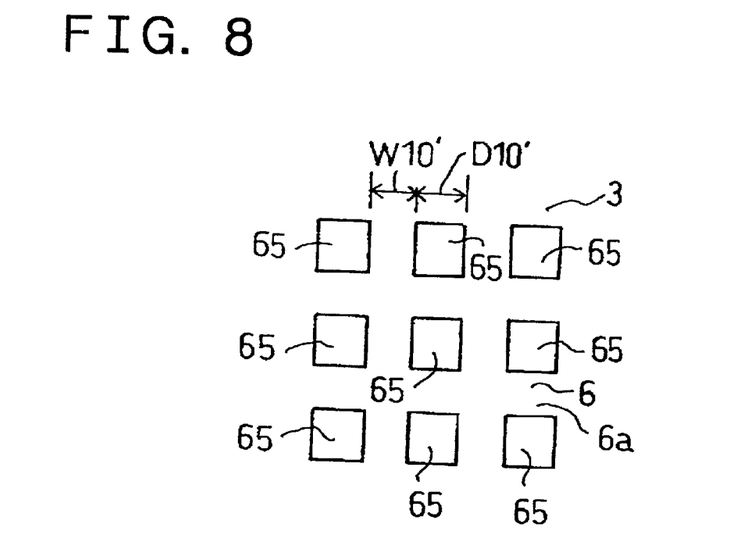
FIG. 8 is a cross-sectional view of a duct portion on the downstream side of the separator according to the modification of FIG. 7.

FIGS. 7 and 8 show essential portions of a variant of the present invention. FIG. 7 shows, in a plan view, an upstream side portion, that is the side of the fuel gas inlet 68, of the separator 3. As shown in FIG. 7, the contact lugs 65 of the separator 3 are substantially square-shaped on the upstream side, and are distributed both in the longitudinal and transverse directions. The contact width of the upstream side contact lug 65 with the negative electrode 12 is larger and equal to D10. An upstream side fuel gas duct 6a in a lattice groove shape is defined by a downstream side neighboring contact lug 65. The upstream side fuel gas duct 6a has a duct width indicated by W10, as shown in FIG. 7.

FIG. 8 shows, in an enlarged cross-sectional view, the downstream side, that is the side of the fuel gas outlet 69, of the separator 3. As shown in FIG. 8, the contact lugs 65 of the separator 3 are also substantially square-shaped on the downstream side, and are distributed both in the longitudinal and transverse directions. The contact width of the downstream side contact lug 65 with the negative electrode 12 is smaller and equal to D10' (D10'<D10). A downstream side fuel gas duct 6a in the lattice groove shape is defined by a downstream side neighboring contact lug 65. The downstream side fuel gas duct 6a has a duct width indicated by W10' (W10'<W10), as shown in FIG .8.

The portions of the contact lugs 65 of the separator 3 contacting with the electrodes constitute the diffusion limiting portion PM, as mentioned above. In the present embodiment, the contact width of the contacting portion of the contact lugs 65 of the separator 3 with the electrodes can be small and equal to D10' (D10'<D10), on the downstream side, that is on the side closer to the fluid outlet, thus reducing the size of each diffusion limiting portion. The result is that, in the present embodiment, diffusion and transmission (migration) of the active material into the electrodes (positive electrode 11 and negative electrode 12) can be improved meritoriously, as in the previous embodiment described above.

With the separator according to the present invention, the contact width of the contact lugs towards the fluid outlet is selected to be smaller than that towards the fluid inlet, so that it is meritoriously possible to improve diffusion of the active material in the active material containing fluid into the inside of the electrodes on the downstream side of the fluid duct, that is on the side closer to the fluid outlet.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A fuel cell comprising a plurality of unit cells each including electrodes sandwiching an electrolyte membrane in-between; and a plurality of separators each arranged between said unit cells;

said separator comprising a plurality of juxtaposed contact lugs facing said electrodes and contacting said electrodes at pre-set contact widths and a plurality of fluid ducts, each having a spacing between neighboring contact lugs as a duct width, and each being adapted for guiding a fluid containing an active material supplied from a fluid inlet towards a fluid outlet;

wherein said separator has an area in which the contact width of said contact lugs on a side closer to said fluid outlet than said fluid inlet is smaller than that of said contact lugs on a side closer to the fluid inlet than said fluid outlet.

2. The fuel cell as defined in claim 1, wherein the duct width of said fluid duct on the side closer to said fluid outlet than said fluid inlet is smaller than that on the side closer to said fluid inlet than said fluid outlet.

3. A separator for use in a fuel cell having a plurality of unit cells each including electrodes sandwiching an electrolyte membrane in-between; and a plurality of separators each arranged between said unit cells;

said separator comprising a plurality of juxtaposed contact lugs facing said electrodes and contacting said electrodes at pre-set contact widths and a plurality of fluid ducts, each having a spacing between neighboring contact lugs as a duct width, and each being configured for guiding a fluid containing an active material supplied from a fluid inlet towards a fluid outlet;

wherein the separator has an area in which the contact width of said contact lug on a side closer to said fluid outlet than said fluid inlet is smaller than that of said contact lug on a side closer to the fluid inlet than said fluid outlet.

4. The separator for use in a fuel cell as defined in claim 3, wherein the duct width of said fluid duct on the side closer to said fluid outlet than said fluid inlet is smaller than that on the side closer to said fluid inlet than said fluid outlet.

* * * * *